United States Patent
Valencia (10) Patent No.: US 12,485,866 B2
(45) Date of Patent: Dec. 2, 2025

(54) BRAKE LINE WITH ATTACHMENT ASSEMBLY FOR EASY INSTALLATION

(71) Applicant: FORD GLOBAL TECHNOLOGIES, LLC, Dearborn, MI (US)

(72) Inventor: Frank Acierno Valencia, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 18/111,076

(22) Filed: Feb. 17, 2023

(65) Prior Publication Data

US 2024/0278761 A1 Aug. 22, 2024

(51) Int. Cl.
| | |
|---|---|
| *B60T 17/04* | (2006.01) |
| *B60T 8/1769* | (2006.01) |
| *F16B 21/04* | (2006.01) |
| *F16L 3/127* | (2006.01) |

(52) U.S. Cl.
CPC .......... *B60T 17/046* (2013.01); *B60T 8/1769* (2013.01); *B60T 17/043* (2013.01); *F16B 21/04* (2013.01); *F16L 3/127* (2013.01)

(58) Field of Classification Search
CPC .... B60T 17/043; B60T 17/046; B60T 8/1769; F16B 21/02; F16B 21/04
USPC .......................................... 411/412, 413, 554
See application file for complete search history.

(56) References Cited

U.S. PATENT DOCUMENTS

| | | | | |
|---|---|---|---|---|
| 2,204,829 | A * | 6/1940 | Shippee | F16B 5/10 |
| | | | | 411/979 |
| 3,851,672 | A * | 12/1974 | De Vincent | F16L 3/12 |
| | | | | 138/109 |
| 4,505,354 | A | 3/1985 | Suzuki et al. | |
| 5,037,142 | A | 8/1991 | Helping | |
| 5,727,304 | A * | 3/1998 | Eybergen | F16L 41/086 |
| | | | | 285/142.1 |
| 6,312,020 | B1 * | 11/2001 | Ketcham | F16L 41/004 |
| | | | | 285/142.1 |
| 6,619,699 | B2 | 9/2003 | Brumfield | |
| 6,908,117 | B1 * | 6/2005 | Pickett, Jr. | F16L 41/086 |
| | | | | 285/137.11 |
| 7,540,539 | B2 * | 6/2009 | Fujiwara | F16L 41/086 |
| | | | | 285/205 |
| 8,141,911 | B2 * | 3/2012 | Cho | F16L 23/0283 |
| | | | | 285/179 |
| 9,702,489 | B2 * | 7/2017 | Yamamoto | F16L 23/02 |

(Continued)

FOREIGN PATENT DOCUMENTS

| | | | | |
|---|---|---|---|---|
| CN | 113525328 A | * | 10/2021 | |
| DE | 3206998 C2 | * | 7/1987 | F16D 21/02 |

(Continued)

*Primary Examiner* — Thomas J Williams
(74) *Attorney, Agent, or Firm* — Burr & Forman; Lorne Forsythe (57) ABSTRACT

An attachment assembly for a fluid line on a vehicle may include a spigot operably coupled to the fluid line such that automotive fluid may flow from the fluid line through the spigot, a coupling member which may operably couple the fluid line to the spigot, and a locking member which may be operably coupled to the coupling member to secure the fluid line to a chassis of the vehicle via insertion of the locking member into a bore disposed at the chassis of the vehicle. The locking member may be installed on the vehicle by hand without the use of tools.

9 Claims, 6 Drawing Sheets

(56) References Cited

U.S. PATENT DOCUMENTS

| | | | | |
|---|---|---|---|---|
| 9,841,044 B2 * | 12/2017 | Wang | ................... | F16B 21/04 |
| 2007/0196196 A1 * | 8/2007 | Schorling | ............... | F16B 21/04 |
| | | | | 411/555 |
| 2011/0037256 A1 * | 2/2011 | Calnek | ................ | F16L 19/0283 |
| | | | | 285/334.5 |
| 2013/0160880 A1 * | 6/2013 | Tiberghien | ............. | F16L 31/00 |
| | | | | 137/798 |
| 2015/0097366 A1 | 4/2015 | Glidewell et al. | | |
| 2022/0090715 A1 | 3/2022 | Paul | | |
| 2022/0170579 A9 | 6/2022 | Kim et al. | | |
| 2024/0278761 A1 * | 8/2024 | Valencia | ............... | B60T 17/043 |

FOREIGN PATENT DOCUMENTS

| | | | | |
|---|---|---|---|---|
| DE | 102004034226 A1 * | 3/2005 | ............. | B60T 13/14 |
| DE | 202007010417 U1 | 12/2008 | | |
| EP | 2211080 A1 | 7/2010 | | |
| GB | 1248395 A | 9/1971 | | |
| WO | 02058973 A2 | 8/2002 | | |

* cited by examiner

BRAKE LINE WITH ATTACHMENT ASSEMBLY FOR EASY INSTALLATION

TECHNICAL FIELD

Example embodiments generally relate to brake lines and, more particularly, relate to a structure for securing the brake lines to a vehicle with a more simple installation procedure.

BACKGROUND

Vehicles may employ a variety of different systems for braking the vehicle, but in many cases these systems may have some similarities. For instance, many vehicles employ hydraulic brakes that use a hydraulic brake fluid to transmit a force applied to the brake pedal to brake calipers disposed at the wheels of the vehicle. Vehicles that use hydraulic brakes may include a brake booster to amplify the force applied to the brake pedal of the vehicle before transferring the force to a master cylinder and eventually to the brake calipers via brake lines. Thus, the brake lines may transmit the hydraulic brake fluid from the master cylinder to the brake calipers in order to engage the brakes and stop the vehicle. In this regard, the brake lines may include tubes or hoses that contain the hydraulic fluid therein, and may essentially operably couple the brake pedal to the brake calipers, allowing the operator of the vehicle to control the braking of the vehicle.

These brake lines, and many other components of the vehicle, are typically secured to the vehicle using various brackets and fasteners that all tend to lengthen the assembly process. Accordingly, there is a need to provide an upgraded attachment assembly for securing brake lines or similar components to the vehicle, which allows for simpler installation.

BRIEF SUMMARY OF SOME EXAMPLES

In accordance with an example embodiment, an attachment assembly for a fluid line on a vehicle of an example embodiment may be provided. The attachment assembly may include a spigot operably coupled to the fluid line such that automotive fluid may flow from the fluid line through the spigot, a coupling member which may operably couple the fluid line to the spigot, and a locking member which may be operably coupled to the coupling member to secure the fluid line to a chassis of the vehicle via insertion of the locking member into a bore disposed at the chassis of the vehicle. The locking member may be installed on the vehicle by hand without the use of tools.

In another example embodiment, a vehicle brake system may be provided. The vehicle brake system may include a wheel of a vehicle, a chassis of the vehicle to which the wheel may be operably coupled, a brake caliper which may be disposed at the wheel and may be operably coupled to the chassis, a brake line which may be operably coupled to the chassis via an attachment assembly, and may provide hydraulic force to operate the brake caliper accordingly, and a brake pedal which may be operably coupled to the brake line. The attachment assembly may include a spigot operably coupled to the fluid line such that automotive fluid may flow from the fluid line through the spigot, a coupling member which may operably couple the fluid line to the spigot, and a locking member which may be operably coupled to the coupling member to secure the fluid line to a chassis of the vehicle via insertion of the locking member into a bore disposed at the chassis of the vehicle.

In yet another example embodiment, a method of installing a brake line in a vehicle may be provided. The method may include connecting a spigot to a brake caliper to permit fluid flow between the brake line and the brake caliper via inserting a locking member, operably coupled to the brake line via a coupling member, into a bore that may be disposed at a chassis of the vehicle, and rotating the locking member relative to the bore until the locking member may enter a locked position responsive to the locking member being rotated to an end of a first thread assembly and a second thread assembly.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some embodiments may provide an attachment assembly for automotive fluid lines such as brake lines that may make the lines easy to install. Some embodiments may provide for the attachment assembly to be installed by hand without requiring the use of tools. As a result, installation of the brake line or other automotive fluid line may require little effort, and the brake line may be secured in the proper location.

Figure 1:
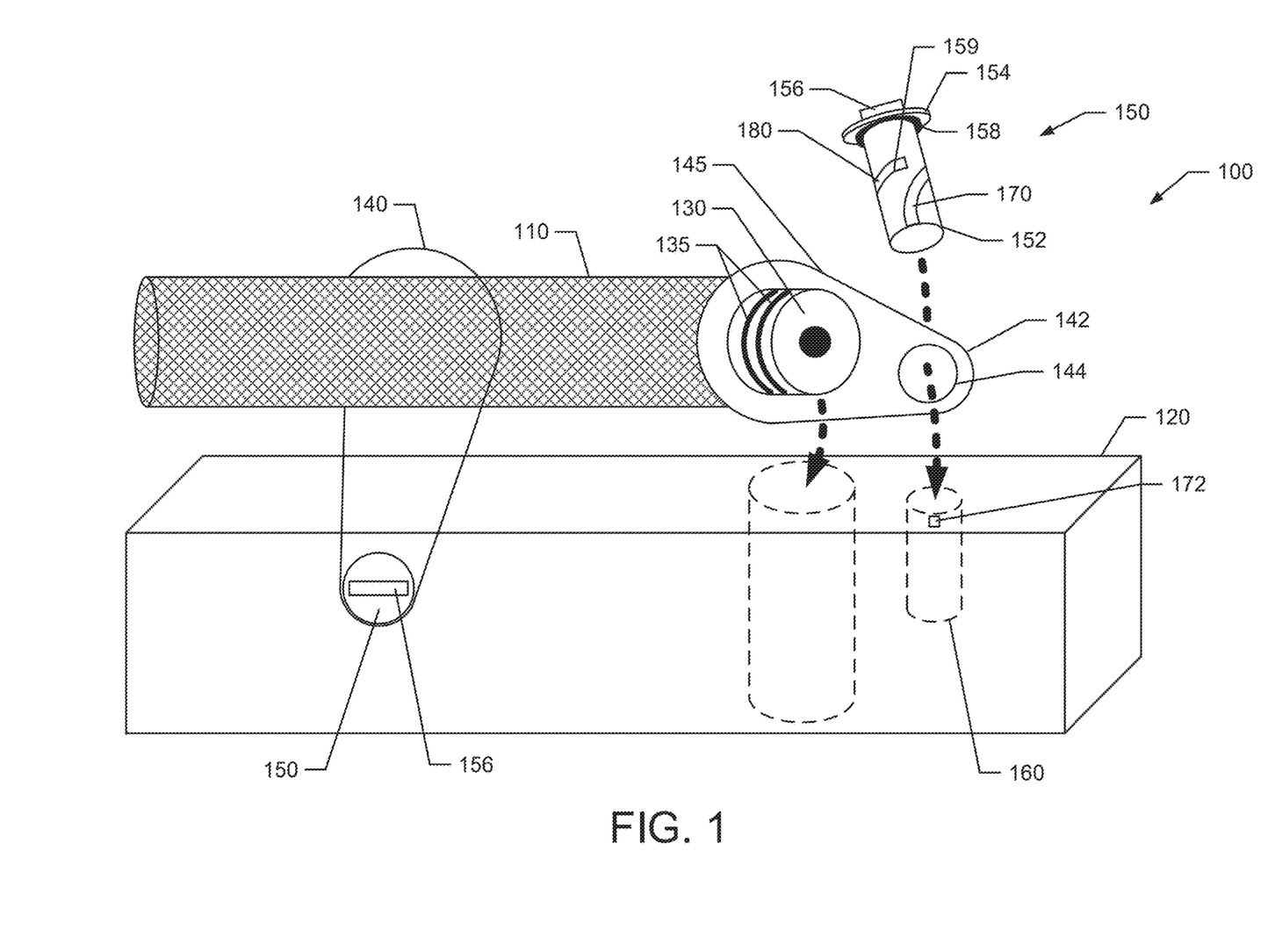
FIG. 1 illustrates a perspective view of an attachment assembly in accordance with an example embodiment.

FIG. 1 illustrates an attachment assembly 100 according to an example embodiment. In some embodiments, the attachment assembly may operably couple a fluid line 110 to the chassis 120 of a vehicle. The attachment assembly 100 may include a spigot 130, a mounting bracket 140, a locking member 150, and a bore 160. In some embodiments, the spigot 130 may be operably coupled to the fluid line 110 such that automotive fluid may flow between the fluid line 110 and another fluid-retaining structure on the vehicle through the spigot 130. In this regard, the spigot 130 may assist in transferring the automotive fluid contained within the fluid line 110 to the target destination of the fluid line 110, which may be some form of fluid-retaining structure in an example embodiment. In some cases, the spigot 130 may include at least one gasket 135 disposed around a neck of the spigot 130. In such cases, the gasket 135 may help create a seal between the spigot 130 and the fluid-retaining structure that the spigot 130 may operably couple to in order to minimize the loss of automotive fluid between the two structures. In an example embodiment, the spigot 130 may operably couple to another fluid line 110, or in some other embodiments, may operably couple to a fluid-retaining structure contained within or otherwise operably coupled to, the chassis 120. In some cases, the fluid line 110 may be a brake fluid line and may therefore help transfer forces via hydraulic brake fluid within the brake system of the vehicle. In this regard, the operator of the vehicle may apply a force to a brake pedal of the vehicle, which may engage a brake booster to build up pressure of the hydraulic brake fluid within the brake lines before applying the force from the pressure of the hydraulic brake fluid at the brake calipers which may be disposed at respective wheels of the vehicle.

In an example embodiment, the mounting bracket 140 may be operably coupled to the spigot 130, and may also extend around and away from the spigot 130. In some cases, the mounting bracket 140 may be an example of a coupling member 145 that may operably couple the fluid line 110 to the spigot 130. In an example embodiment, the spigot 130 may extend through the mounting bracket 140, and the mounting bracket 140 may include an ear 142 that may extend away from the spigot 130 and may include an orifice 144. In this regard, the mounting bracket 140 and the spigot 130 may be fixedly operably coupled so that the spigot 130 and the mounting bracket 140 may move and be oriented as one structure. In some cases, the spigot 130 and the mounting bracket 140 may even be integrated in with each other, and may be formed from a same material. In an example embodiment, the mounting bracket 140 may be made out of a steel or other metal and may be brazed onto a crimp of the fluid line 110, proximate to the spigot 130. The ear 142 may extend away from the spigot 130 so as to allow room for the insertion of the locking member 150 through the orifice 144 without the locking member 150 interfering with the functionality of the spigot 130. In an example embodiment, the ear 142 of the mounting bracket 140 may extend in a direction substantially perpendicular to the direction of extension of the spigot 130. In this regard, the locking member 150 may be inserted through the orifice 144, into the bore 160 within the chassis 120, and accordingly extend parallel to the spigot 130.

The locking member 150 may operably couple the coupling member 145, and thus the fluid line 110, to the chassis 120 of the vehicle. In some embodiments, the locking member 150 may resemble a pin or a plug, and the locking member 150 may be inserted into the bore 160 in the chassis 120 via the orifice 144. In other words, a body 152 of the locking member 150 may be substantially cylindrical in shape and may have an outer diameter not larger than a diameter of the orifice 144 so that the body 152 may be inserted through the orifice 144 with ease, and into the bore 160. The locking member 150 may also include a flanged end 154 at a first end of the body 152 of the locking member 150, and a handle 156 disposed on an opposite side of the flanged end 154 from the body 152. In some cases, the locking member 150 may be 3D printed or otherwise formed from a plastic (e.g. ABS plastic) or a similar material. The flanged end 154 may have an outer diameter greater than the diameter of the orifice 144 so that the locking member 150 does not extend through the orifice 144 beyond the flanged end 154 when operably coupling the mounting bracket 140 to the chassis 120. The handle 156 disposed on the flanged end 154 may resemble a protrusion that may help a person installing or tightening the locking member 150 to rotate the locking member 150 by hand relative to the orifice 144 when entering the bore 160. In other words, the mounting bracket 140 and the bore 160 may not rotate responsive to the locking member 150 being rotated. In this regard, the locking member 150 may be a cam lock that may effectively lock the mounting bracket 140 to the chassis 120 via the bore. In other words, the locking member 150 rotates to either secure or release the mounting bracket 140 from the chassis 120, and as the locking member 150 rotates to secure the mounting bracket 140 to the chassis 120, the locking member 150 may move the mounting bracket 140 and the spigot 130 into more secure contact with the chassis 120 via the flanged end 154. Thus, the locking member 150 may be classified as a cam lock due to functioning as a locking mechanism to move the mounting bracket 140 and spigot 130 into a secure position relative to the chassis 120. Accordingly, the locking member 150 may thus allow the fluid line 110 and the attachment assembly 100 to be installed (e.g. tightened) on to the vehicle without requiring the use of tools.

In the embodiment depicted in FIG. 1, the locking member 150 may further include at least one thread assembly disposed on the body 152, and a compressible member 158, which may be disposed proximate to the flanged end 154. FIG. 1 depicts the locking member 150 with a first thread assembly 170 and a second thread assembly 180, with each thread assembly contacting a second end of the body 152 of the locking member 150, opposite from the flanged end 154. In some cases, the first thread assembly 170 may be disposed 180° around the outer surface of the body 152 from the second thread assembly 180. The first and second thread assemblies (170, 180) may be formed into the outer surface of the body 152 and may resemble a channel or a groove that may have been cut into, or otherwise formed into, the outer surface of the body 152 of the locking member 150. In some cases, the first and second thread assemblies (170, 180) may extend up the body 152, towards the flanged end 154, in a spiral-like manner. In other words, the first and second thread assemblies (170, 180) may extend away from the second end of the body 152 at an angle such that the first and second thread assemblies (170, 180) wrap around the outer surface of the body 152 of the locking member 150. In this regard, the first and second thread assemblies (170, 180) may be defined by a pitch of the individual threads. In such cases, the pitch may refer to a number of threads per unit of axial length of the locking member 150. The pitch of the first and second thread assemblies (170, 180) may directly effect how many full rotations of the locking member 150 may be required to secure the locking member 150 into the bore 160. In some embodiments, the first and second thread assemblies (170, 180) of the locking member 150 may be shaped and/or sized differently to ensure the locking member 150 may only be inserted in a proper orientation, as will be described below.

Also shown in FIG. 1, in an example embodiment, the attachment assembly 100 may include mounting brackets 140 and locking members 150 disposed along a length of the fluid line 110 in order to operably couple the fluid line 110 to the chassis 120 at multiple different locations along the fluid line 110. In such cases, the chassis 120 may accordingly include a number of bores 160 disposed along the chassis 120, to which the multiple locking members 150 may operably couple.

Figure 2A:
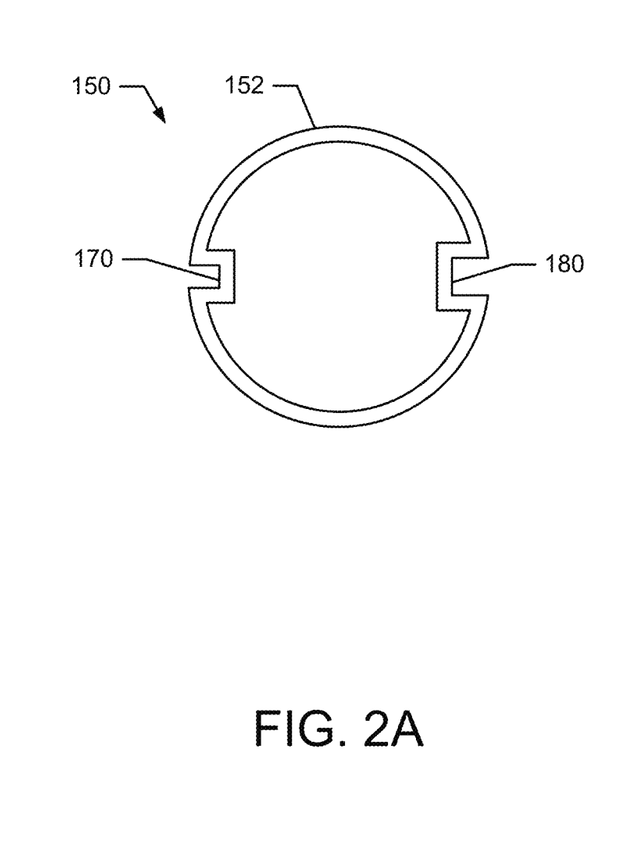
FIG. 2A depicts a cross section view of the locking member in accordance with an example embodiment.
Figure 2B:
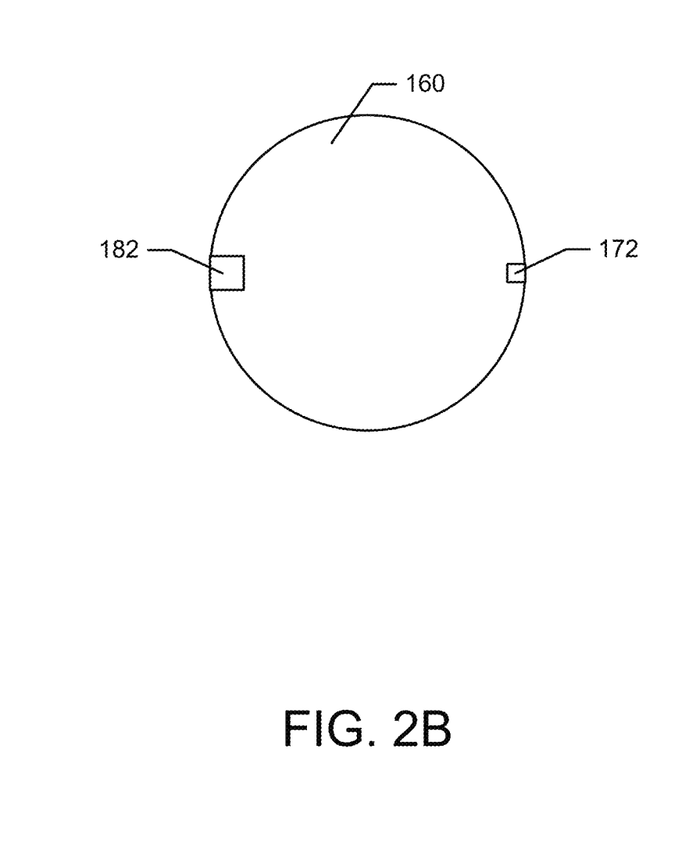
FIG. 2B depicts a cross section view of the bore in accordance with an example embodiment.
Figure 3:
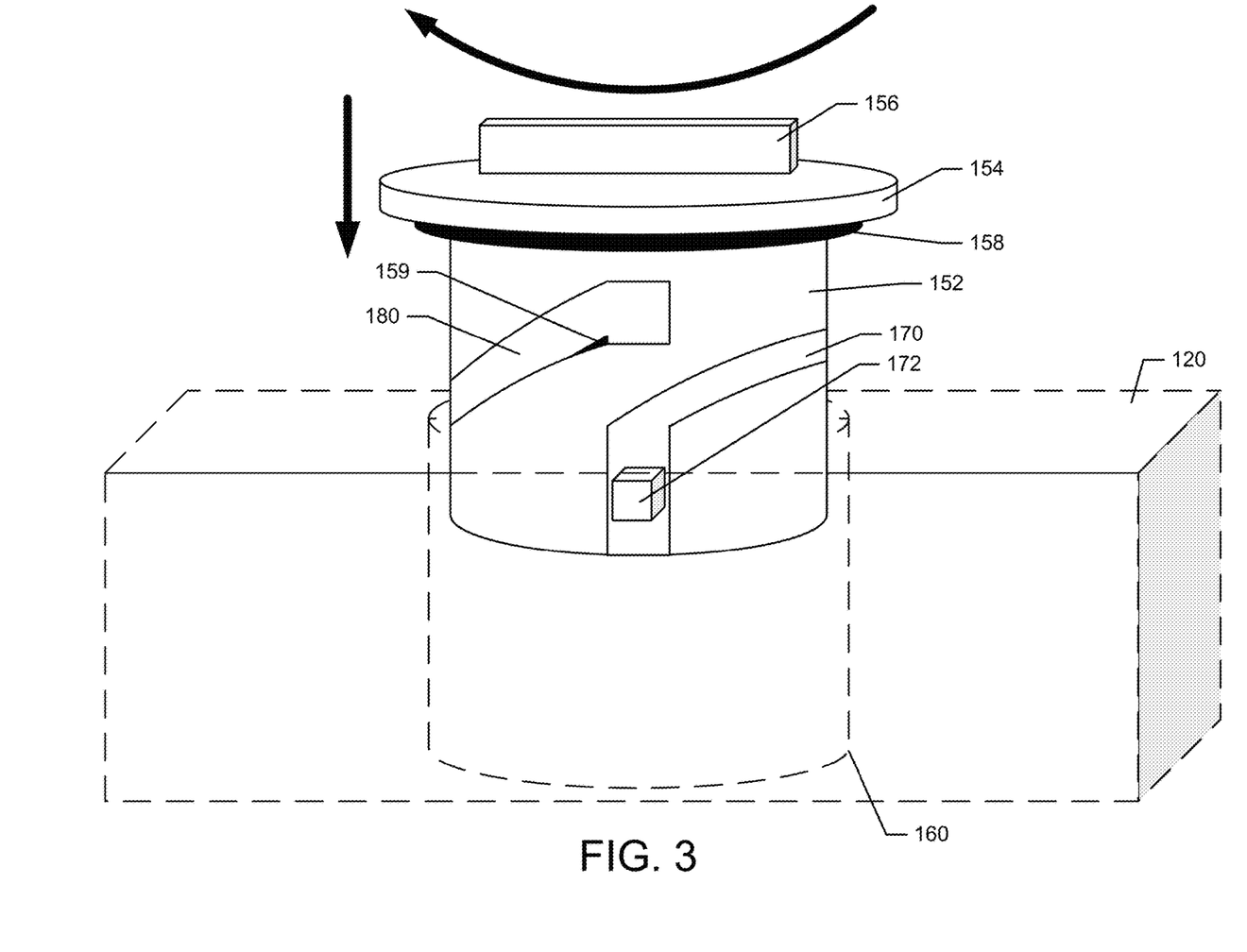
FIG. 3 depicts a perspective view of the locking member in the bore in accordance with an example embodiment.

FIG. 2A depicts a cross section view of the locking member 150 and FIG. 2B depicts a cross section view of the bore 160, according to an example embodiment, whereas FIG. 3 depicts a perspective view of installing the locking member 150 into the bore 160, according to an example embodiment. In this regard, the first and second thread assemblies (170, 180) may align with a first complimentary thread member 172 and a second complimentary thread member 182, respectively, that may each be disposed within the bore 160. The bore 160 may be disposed in the chassis 120 or in any other component of the vehicle to which the fluid line 110 may need to be operably coupled. In this regard, the first and second complimentary thread members (172, 182) may be disposed within the bore 160 on an inner surface of the bore 160. The first complimentary thread member 172 may be disposed 180° around the inner surface of the bore 160 from the second complimentary thread member 182. As such, the first complimentary thread member 172 may align with, and enter, the first thread assembly 170 on the locking member 150, and the second complimentary thread member 182 may align with, and enter, the second thread assembly 180 on the locking member 150 responsive to the locking member 150 being inserted into the bore 160 in a proper orientation. Accordingly, the proper orientation may be defined as the orientation of the locking member 150 in which the first and second complimentary thread members (172, 182) align with the first and second thread assemblies (170, 180), respectively. In this regard, the first thread assembly 170 may only be big enough to allow the first complimentary thread member 172 to enter, and not the second complimentary thread member 182. Thus, in some cases, the locking member 150 may only be inserted into the bore 160 in the proper orientation. In an example embodiment, the first and second complimentary thread members (172, 182) may be projections that extend inward towards the center of the bore 160, from an inner surface of the bore 160. In this regard, the first and second complimentary thread members (172, 182) may be sized to fit within the first and second thread assemblies (170, 180), respectively.

As shown in FIG. 3, responsive to the locking member 150 entering the bore 160 and rotating in a clockwise direction, the first and second thread assemblies (170, 180) may move relative to the first and second complimentary thread members (172, 182) until the locking member 150 enters a locked position. In the locked position, the locking member 150 may be positioned such that the first and second complimentary thread members (172, 182) may be at the end of the first and second thread assemblies (170, 180), respectively. At the end of each of the first and second thread assemblies (170, 180) may be a retention tab 159 that may be designed to allow the first and second complimentary thread members (172, 182) to easily access their respective thread assembly ends, but also to make it more difficult for the first and second complimentary thread members (172, 182) to exit their respective thread assembly ends. In this regard, responsive to the locking member 150 being in the locked position, the compressible member 158 may be compressed against the mounting bracket 140 and may therefore provide a biasing force on the locking member 150 away from the bore 160.

In this regard, the compressible member 158 may bias the first and second complimentary thread members (172, 182) into contact with the retention tabs 159 at the end of the first and second thread assemblies (170, 180), respectively, responsive to the locking member 150 being rotated into the locked position. In some cases, the compressible member 158 may be a rubber gasket or o-ring disposed around the body 152 of the locking member 150 proximate to the flanged end 154. In another example embodiment, the compressible member 158 may include a tab operably coupled to a spring that may be depressed responsive to the locking member 150 entering the locked position. By design, a number of rotations of the locking member 150 to secure the locking member 150 into the bore 160 in the locked position may be a direct result of the pitch of the first and second thread assemblies (170, 180). According to an example embodiment, the locking member 150 may enter the locked position responsive to being rotated 180° (i.e. one half turn) within the bore 160. In some other cases, the locking member 150 may enter the locked position responsive to completing one or more full rotations within the bore 160.

Figure 4:
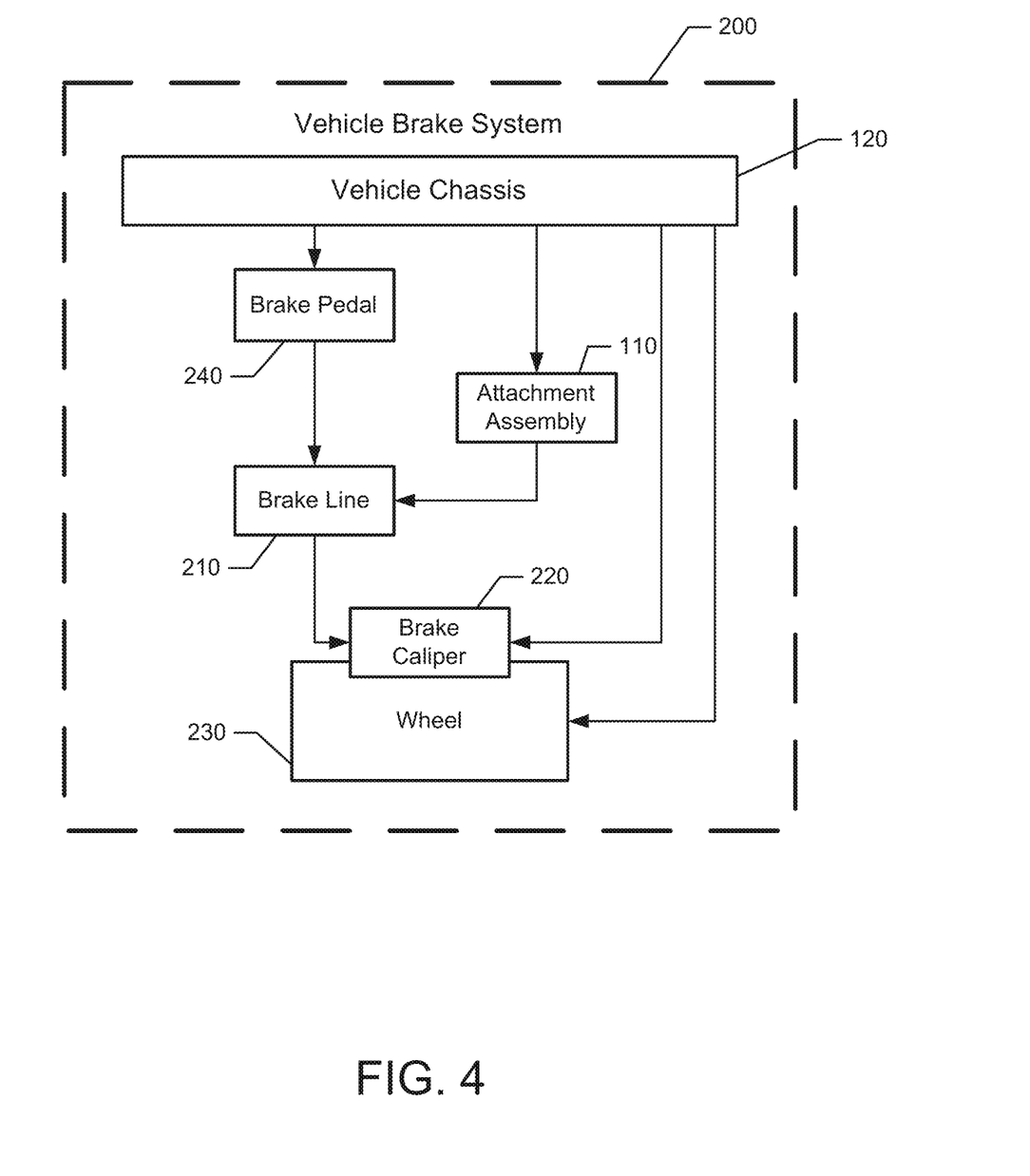
FIG. 4 illustrates a block diagram of a vehicle brake system in accordance with an example embodiment.

FIG. 4 illustrates a block diagram of a vehicle brake system 200 according to an example embodiment. Although the above described attachment assembly 100 for the fluid line 110 may operably couple many different structures, as mentioned above, the attachment assembly 100 may be used to secure a brake line 210 to the vehicle chassis 120. Accordingly, the brake line 210 may contain hydraulic brake fluid to provide a force to a brake caliper 220 disposed at a wheel 230 of the vehicle. In this regard, the operator of the vehicle may apply a force to a brake pedal 240 of the vehicle, which may engage a brake booster that may build up pressure of the hydraulic brake fluid within the brake line 210 before applying hydraulic force from the pressure of the hydraulic brake fluid at the brake caliper 220 at a respective wheel 230 of the vehicle. In some cases, the attachment assembly 100 may also be used to operably couple the brake line 210 to the brake caliper 220.

Figure 5:
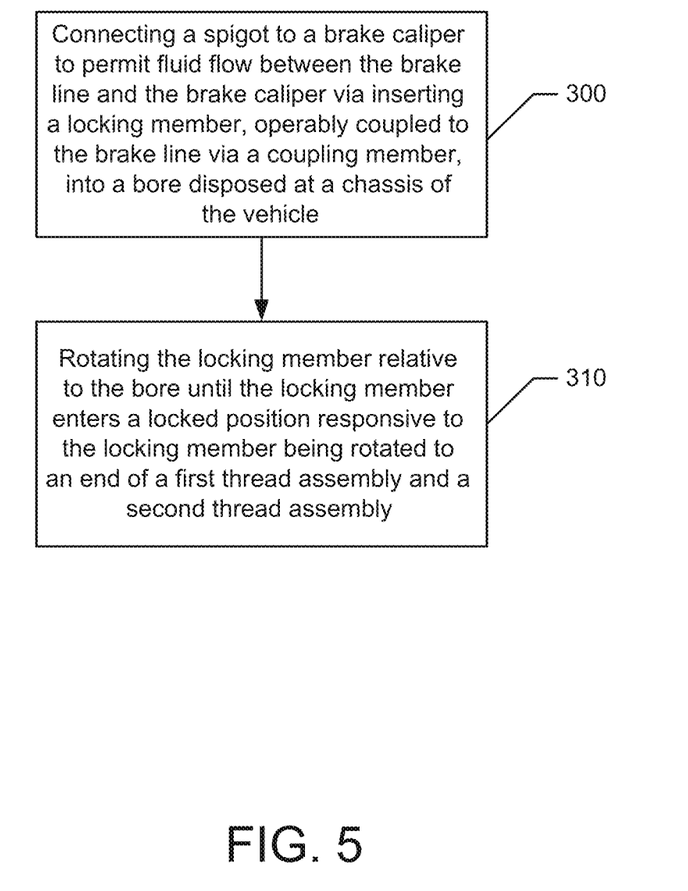
FIG. 5 illustrates a method of installing a brake line in a vehicle using the attachment assembly in accordance with an example embodiment.

FIG. 5 illustrates a method of installing the brake line 210 in a vehicle using the attachment assembly 100, according to an example embodiment. The method may include connecting the spigot 130 to a brake caliper 220 to permit fluid flow between the brake line 210 and the brake caliper 220 via inserting the locking member 150, operably coupled to the brake line 210 via a coupling member 145, into the bore 160 which may be disposed at the chassis 120 of the vehicle, in step 300. In step 310, the method may include rotating the locking member 150 relative to the bore 160 until the locking member 150 may enter the locked position responsive to the locking member 150 being rotated to an end of the first thread assembly 170 and the second thread assembly 180. As such, the attachment assembly 100 may allow for the brake line 210 to be installed (e.g. tightened) without the use of tools, and may rely only on the hands of the installer for simpler installations.

Figure 6:
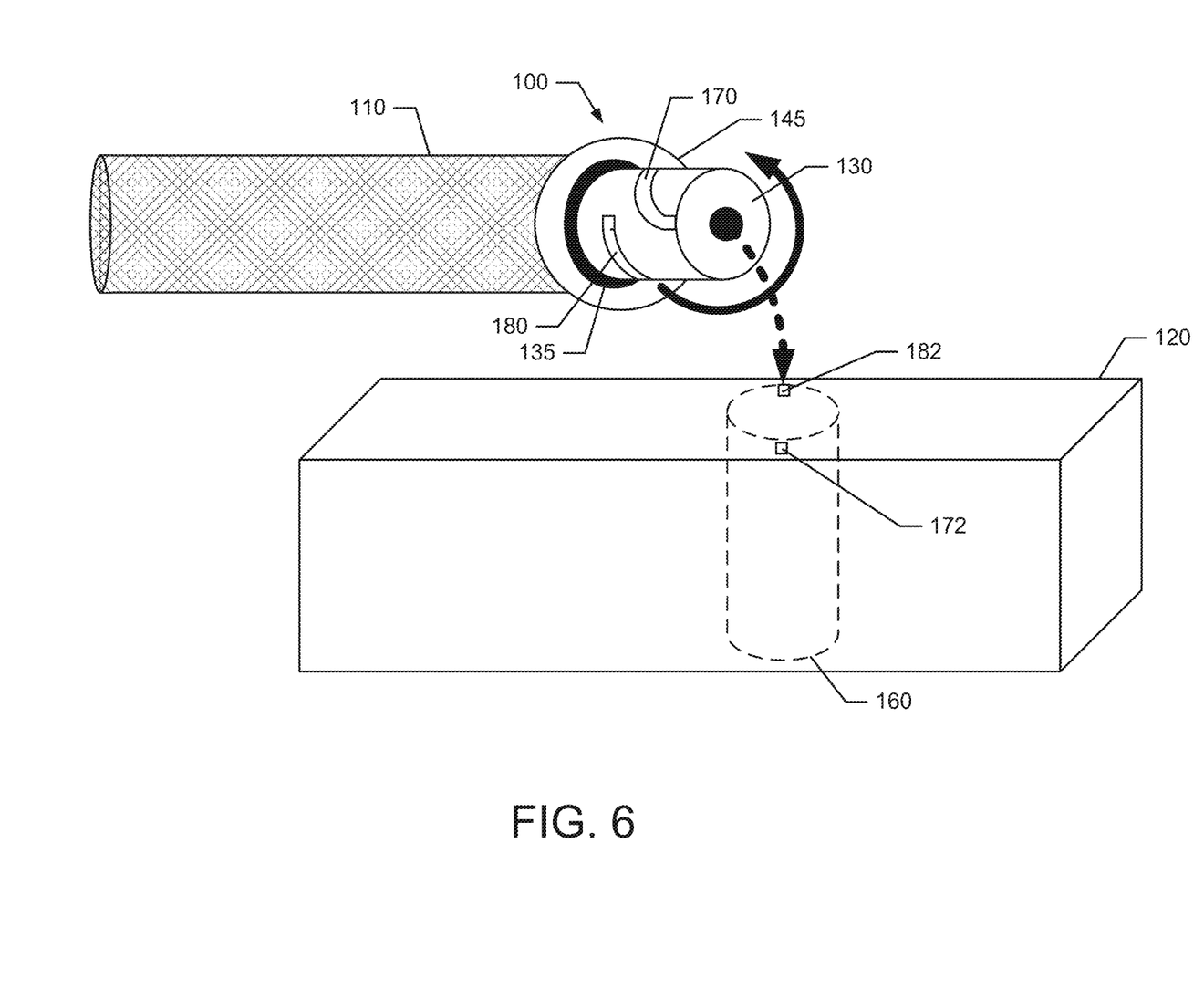
FIG. 6 illustrates a perspective view of an attachment assembly in accordance with an example embodiment.

FIG. 6 illustrates a perspective view of an attachment assembly 100 in accordance with an example embodiment. In the embodiment shown in FIG. 6, the locking member 150, which may include the first and second thread assemblies (170, 180), may be disposed at an exterior surface of the spigot 130, rather than on a separate component. In this regard, the bore 160, may also be the fluid-retaining structure that may convey the fluid from the fluid line 110 to its destination. As such, the bore 160 may still include the first and second complimentary thread members (172, 182), which may still operably couple to the first and second thread assemblies (170, 180), respectively. In the embodiment of FIG. 6, the installation of the fluid line 110 may be made even simpler due to having one less hardware component to install. In some cases, the locking member 150 disposed at the spigot 130 may rotate independently of the fluid line 110 and the coupling member 145 to enter the locked position within the bore 160. In some other cases, however, the entire fluid line 110 may rotate with the locking member 150 as the attachment assembly 100 is used to install the fluid line 110 on the chassis 120. In still some other example embodiments, the coupling member 145 may rotate with the locking member 150 to assist in securing the locking member 150 within the bore 160. In the example embodiment of FIG. 6, the gasket 135 may also act as the compressible member 158 that biases the first and second complimentary thread members (172, 182) into the end of the first and second thread assemblies (170, 180), respectively. In this regard, the gasket 135 may have a dual purpose of providing a seal around the spigot 130, proximate to the coupling member 145, as well as biasing the locking member 150 into the locked position in the bore 160. In such example embodiments, such as the one depicted in FIG. 6, the locking member 150 disposed at the spigot 130 may rotate and secure the fluid line 110 to the chassis 120 in a manner substantially similar to that described above in reference to the locking member 150 disposed on a separate component.

An attachment assembly for a fluid line on a vehicle of an example embodiment may therefore be provided. The attachment assembly may include a spigot operably coupled to the fluid line such that automotive fluid may flow from the fluid line through the spigot, a coupling member which may operably couple the fluid line to the spigot, and a locking member which may be operably coupled to the coupling member to secure the fluid line to a chassis of the vehicle via insertion of the locking member into a bore disposed at the chassis of the vehicle. The locking member may be installed on the vehicle by hand without the use of tools.

The attachment assembly of some embodiments may include additional features, modifications, augmentations and/or the like to achieve further objectives or enhance performance of the attachment assembly. The additional features, modifications, augmentations and/or the like may be added in any combination with each other. Below is a list of various additional features, modifications, and augmentations that can each be added individually or in any combination with each other. For example, the locking member may include a first thread assembly and a second thread assembly which may each be disposed to curve radially while extending axially along the locking member and may be 180° apart from each other on the outer surface of the locking member. In an example embodiment, the first thread assembly and the second thread assembly may be disposed 180° apart from each other on the outer surface of the locking member. In some cases, the bore may include a first complimentary thread member and a second complimentary thread member which may each be disposed on an inner surface of the bore. In an example embodiment, the first complimentary thread member and the second complimentary thread member may be disposed 180° apart from each other on the inner surface of the bore. In some cases, the first complimentary thread member may align with, and may enter, the first thread assembly on the locking member and the second complimentary thread member may align with, and may enter, the second thread assembly on the locking member, responsive to the locking member being inserted into the bore in a proper orientation. In an example embodiment, the first thread assembly may be sized to only allow the first complimentary thread member to enter the first thread assembly. In some cases, the locking member may include a retention tab at respective ends of each of the first and second thread assemblies which may retain each of the first and second complimentary thread members to secure the locking member in place responsive to the locking member being rotated to the end of the first and second thread assemblies. In an example embodiment, the locking member may further include a compressible member. In some cases, the compressible member may bias the locking member away from the bore and may bias the first and second complimentary thread members into contact with the retention tabs at the end of the first and second thread assemblies, respectively, responsive to the locking member being rotated to the end of the first and second thread assemblies. In an example embodiment, a number of rotations to secure the locking member to the bore in a locked position may be a direct result of a pitch of the first and second thread assemblies. In some cases, the locking member may enter the locked position responsive to being rotated 180° within the bore. In an example embodiment, the fluid line on the vehicle may be a brake line.

A vehicle brake system of an example embodiment may therefore be provided. The vehicle brake system may include a wheel of a vehicle, a chassis of the vehicle to which the wheel may be operably coupled, a brake caliper which may be disposed at the wheel and may be operably coupled to the chassis, a brake line which may be operably coupled to the chassis via an attachment assembly, and may provide hydraulic force to operate the brake caliper accordingly, and a brake pedal which may be operably coupled to the brake line. The attachment assembly may include a spigot operably coupled to the fluid line such that automotive fluid may flow from the fluid line through the spigot, a coupling member which may operably couple the fluid line to the spigot, and a locking member which may be operably coupled to the coupling member to secure the fluid line to a chassis of the vehicle via insertion of the locking member into a bore disposed at the chassis of the vehicle.

A method of installing a brake line in a vehicle may therefore be provided. The method may include connecting a spigot to a brake caliper to permit fluid flow between the brake line and the brake caliper via inserting a locking member, operably coupled to the brake line via a coupling member, into a bore that may be disposed at a chassis of the vehicle, and rotating the locking member relative to the bore until the locking member may enter a locked position responsive to the locking member being rotated to an end of a first thread assembly and a second thread assembly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are That which is claimed:

1. A vehicle brake system, the vehicle brake system comprising:
   a wheel of a vehicle;
   a chassis of the vehicle, to which the wheel may be operably coupled;
   a brake caliper disposed at the wheel and operably coupled to the chassis;
   a brake line operably coupled to the chassis via an attachment assembly, to provide hydraulic force to operate the brake caliper accordingly; and
   a brake pedal operably coupled to the brake line,
   wherein the attachment assembly comprises:
      a spigot operably coupled to the fluid line such that automotive fluid flows from the fluid line through the spigot;
      a coupling member operably coupling the fluid line to the spigot;
      a first locking member operably coupled to the coupling member to secure the fluid line to the chassis of the vehicle via insertion of the first locking member into a first bore disposed at the chassis of the vehicle, and
      a second locking member operably coupled to a mounting bracket to secure the fluid line to the chassis of the vehicle via insertion of the second locking member into a second bore disposed at the chassis of the vehicle,
      wherein the first bore extends into the chassis in a first direction and the second bore extends into the chassis in a second direction, and
      wherein the first direction is normal to the second direction.

2. The vehicle brake system of claim 1, wherein the first and second locking members each comprise a first thread assembly and a second thread assembly disposed on an outer surface of the locking member, wherein the first thread assembly and the second thread assembly are disposed to curve radially while extending axially along the locking member 180° apart from each other on the outer surface of the locking member.

3. The vehicle brake system of claim 2, wherein the first and second bores each comprise a first complimentary thread member and a second complimentary thread member disposed on an inner surface of the first and second bores,
   wherein the first complimentary thread member and the second complimentary thread member are disposed 180° apart from each other on the inner surface of the first and second bores.

4. The vehicle brake system of claim 3, wherein the first complimentary thread member aligns with, and enters, the first thread assembly on the first and second locking members and the second complimentary thread member aligns with, and enters, the second thread assembly on the first and second locking members responsive to the first and second locking members being inserted into the first and second bores in a proper orientation.

5. The vehicle brake system of claim 4, wherein the first thread assembly is sized to only allow the first complimentary thread member to enter the first thread assembly.

6. The vehicle brake system of claim 5, wherein the first and second locking members each comprise a retention tab at respective ends of each of the first and second thread assemblies that retains each of the first and second complimentary thread members to secure the first and second locking members in place responsive to the first and second locking members being rotated to the end of the first and second thread assemblies.

7. The vehicle brake system of claim 6, wherein the first and second locking members each further comprise a compressible member,
   wherein the compressible member biases the first and second locking members away from the first and second bores and biases the first and second complimentary thread members into contact with the retention tabs at the end of the first and second thread assemblies, respectively, responsive to the first and second locking members being rotated to the end of the first and second thread assemblies.

8. The vehicle brake system of claim 2, wherein a number of rotations to secure the first and second locking members to the first and second bores in a locked position is a direct result of a pitch of the first and second thread assemblies.

9. The vehicle brake system of claim 8, wherein the first and second locking members enters the locked position responsive to being rotated 180° within the first and second bores.

* * * * *